United States Patent [19]

Yoshida

[11] Patent Number: 4,666,253

[45] Date of Patent: May 19, 1987

[54] LIQUID CRYSTAL DEVICE

[75] Inventor: Akio Yoshida, Oiso, Japan

[73] Assignee: Canon Kabushiki Kaisha, Tokyo, Japan

[21] Appl. No.: 747,030

[22] Filed: Jun. 20, 1985

[30] Foreign Application Priority Data

Jun. 28, 1984 [JP] Japan .................. 59-131971
Jun. 28, 1984 [JP] Japan .................. 59-131972

[51] Int. Cl.⁴ .................................. G02F 1/13
[52] U.S. Cl. ........................................... 350/334
[58] Field of Search ............. 350/330, 334, 336, 337, 350/338, 339, 343, 348, 349, 350

[56] References Cited

U.S. PATENT DOCUMENTS 4,390,245  6/1983  Shimizu et al. ................ 350/343
4,391,491  7/1983  Freer et al. ................... 350/341

FOREIGN PATENT DOCUMENTS 79412   6/1980  Japan ................. 350/343
40809   4/1981  Japan ................. 350/330
92315   6/1982  Japan ................. 350/343
204027 12/1982  Japan ................. 350/345

Primary Examiner—Donald A. Griffin
Attorney, Agent, or Firm—Fitzpatrick, Cella, Harper & Scinto

[57] ABSTRACT

A liquid crystal device of a cell structure having a pair of base plates, and a liquid crystal disposed between the base plates and in contact with an adsorbent for ionic substance in the cell. The liquid crystal device is particularly adapted for being constituted as a type driven by a thin film transistor.

6 Claims, 9 Drawing Figures

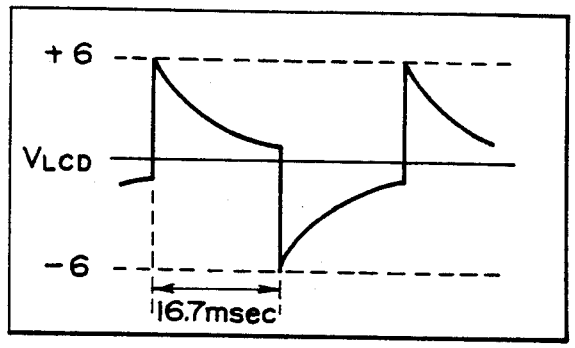
(a) NO ADSORBENT CONTACTED
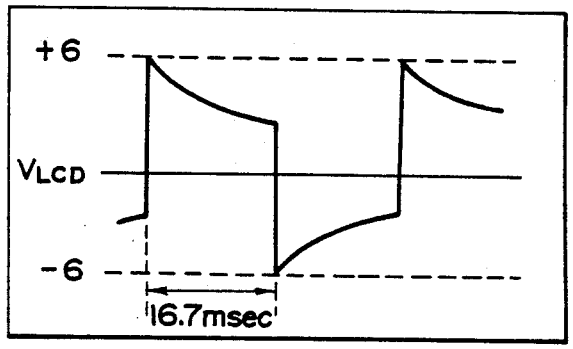
(b) IMPROVED ORIENTATION FILM
F I G. 9

LIQUID CRYSTAL DEVICE

BACKGROUND OF THE INVENTION

This invention relates to a liquid crystal device and, more particularly, to a liquid crystal device suited to be driven for switching by thin film transistors.

FIG. 1 is a sectional view showing an example of a prior art liquid crystal device with an array of thin film transistors (TFT) for one picture element. On a base plate 2 of glass or the like are successively provided a gate electrode 8, an insulating film 7 and a semiconductor layer 6. Further, a source layer (i.e., signal line) 5 and a drain layer 4 are provided on the gate electrode 8, with the drain 4 connected to a picture element electrode 3 provided on the base plate 2. A liquid crystal orientation film 9 is provided on the entire surface of the structure described above. On another base plate 1 are provided a picture element electrode 3 and an orientation film 9. The two base plates noted above are arranged so that they face each other, and they are bonded to each other at their peripheral parts by an epoxy adhesive or the like. A liquid crystal 11 is sealed in the space thus defined between the two base plates.

FIG. 2 shows an equivalent circuit of the liquid crystal device described above. Designated at $R_{ON}$ and $R_{OFF}$ are resistances of the TFT in the "on" and "off" states, respectively, at $C_{i1}$, $C_{i2}$ and $C_{LC}$ capacitances of the orientation films and liquid crystal, respectively, and $R_{i1}$, $R_{i2}$ and $R_{LC}$ are resistances thereof, respectively.

FIG. 3 shows an example of voltage waveforms when the TFT is driven. It is assumed that a gate pulse as shown at $V_G$ in FIG. 3 is applied to the gate electrode 8 shown in FIG. 1 and a voltage of $+V_S$ volts is simultaneously applied to the source 5. At this time, the voltage $V_{LCD}$ between the upper and lower picture element electrodes 3 quickly rises to $+V$ (charge process). With a subsequent fall of $V_G$ the voltage $V_{LCD}$ is reduced from $+V_S$ due to leakage of charge stored in the liquid crystal layer (discharge process). The time constant $\tau_{OFF}$ in the discharge process is given as $$\tau_{OFF} = R_{LC} C_{LC} \quad (1)$$

As is seen, it depends on the resistance $R_{LC}$ of the liquid crystal layer.

The effective voltage applied to the liquid crystal layer is shown shaded in FIG. 3. At instant $t = t_1$, it is shown as $V_{LC}(0)$. Shown at $V_i$ is a voltage applied across the orientation films and not across the liquid crystal layer.

The voltage is given as $$V_{LC}(0) = \frac{C_i}{C_i + C_{LC}} \cdot V_S \quad (2)$$

where $$C_i = \left(\frac{1}{C_{i1}} + \frac{1}{C_{i2}}\right)^{-1}.$$

With reducing resistance $R_{LC}$ of the liquid crystal layer, the shaded area in FIG. 3 is reduced, i.e., the effective voltage across the liquid crystal layer is reduced. Therefore, with a horizontally orientated liquid crystal device (LCD) using a nematic phase liquid crystal having a positive dielectric anisotropy, the V (voltage) versus T (transparency) curve obtained when the LCD is TFT-driven is shifted toward the higher voltage side when compared with the curve obtained by driving the LCD with a rectangular pulse or wave. A curve (a) in FIG. 5 (or FIG. 8) is obtained with an LCD using "E-7" (a biphenyl type nematic liquid crystal composition available from BDH Chemical Ltd.). The LCD has 1,000 Å polyimide orientation films and has a cell gap of 10 μ and a twist angle of 90°.

FIG. 5 (or FIG. 8) shows examples of the waveform of $V_{LCD}$ when $V_S = 6$ V. A liquid crystal device for a television set or the like is usually of a line sequential drive type for display on screen. Therefore, it is necessary to hold information on each scanning line while it is not selected. In the case of 60 Hz non-interlace mode, this period is approximately 16.7 msec. If $V_{LC}(t)$ becomes lower than the threshold voltage $V_{th}$ of the liquid crystal, the image can no longer be displayed. Where "E-7" is used under the ordinary conditions, $V_{LCD}$ is greatly reduced as shown by a curve (a) in FIG. 5 (or a curve (a) in FIG. 8). This is attributable to the fact that the resistance $R_{LC}$ of the liquid crystal layer is low.

As has been shown, when the resistance of the liquid crystal is reduced in case of the TFT driving of LCD, (a) the voltage versus transparency (V-T) curve is shifted toward the higher voltage side, i.e., the drive voltage is increased, and (b) no image appears on the screen in an extreme case.

SUMMARY OF THE INVENTION

The present invention seeks to solve the problems that have heretofore been caused by the reduction in resistance of the liquid crystal layer in extended use.

The invention is based on the findings that the reduction in resistance of the liquid crystal layer is caused by ions released from the material in contact with the liquid crystal and dissolved in the liquid crystal, and that the reduction in resistance of the liquid crystal in a TFT-driven liquid crystal device as well as increase in drive voltage and failure of appearance of image due to the reduction in resistance can be eliminated by causing the ions to be adsorbed by an adsorbent and thus suppressing increase in ion concentration in the liquid crystal.

According to the present invention, there is provided a liquid crystal device having a cell structure with a liquid crystal disposed between a pair of base plates, in which the liquid crystal is disposed in contact with an adsorbent for ionic substances in the cell.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 9 is a waveform diagram showing the waveform of $V_{LCD}$ at $V_S = 6$ V (at 30 Hz) obtained with (a) the non-treated orientation film and (b) the improved orientation film according to the invention.

DESCRIPTION OF THE PREFERRED EMBODIMENTS

When the liquid crystal layer resistance $R_{LC}$ in the equation (1) described hereinbefore is increased, $\tau_{OFF}$ is increased, that is, information holding time is increased.

The resistivity $\rho$ of the liquid crystal layer is related to $R_{LC}$ as follows:

$$R_{LC} = \frac{\rho \cdot d}{S} \quad (3)$$

where S is the electrode area, and d is the distance between opposite electrodes. In the stage of manufacture of liquid crystal composition, it is sufficiently possible to obtain a resistivity $\rho$ of $1 \times 10^{11}$ Ωcm or above by repeating the refinement. However, after the liquid crystal is introduced in the LCD, it dissolves impurities in the cell so that $\rho$ is reduced. The $\rho$ empirically is at a level of $5 \times 10^9$ to $5 \times 10^{10}$ Ωcm, and the concentration of the dissolved impurities at this time is estimated from other experiments to be several ppm or lower. In other words, the $\rho$ is reduced by the order of one digit by the dissolution of impurities of several ppm or lower. The resistance $R_{LC}$ is similarly reduced. The other way round, a high value of $R_{LC}$ can be retained by removing impurities at a concentration of the order of several ppm.

Based on the above finding, according to the present invention, an adsorbent is incorporated in the liquid crystal composition to be introduced in the cell for increasing $R_{LC}$.

As the adsorbent for ionic substance according to the invention there may be used, for example, alumina, zeolite, ion-exchange resins, carbon and such metals as metallic aluminum, metallic nickel and iron-cobalt alloys.

The adsorbent should have a particle size smaller than the spacer particle size (approximately 10 μ), preferably of 1 to 0.005 μ, in order to introduce it into the LCD. The adsorbent per se may constitute a spacer. In this case, the size of the adsorbent is preferably approximately 10 μ or less in correspondence with the cell gap.

The concentration of the adsorbent is preferably from 0.05 to 0.005% by weight, more preferably from 0.2 to 9% by weight, of the liquid crystal composition.

The adsorbent is suitably uniformly dispersed in the liquid crystal composition using ultrasonic vibrators or the like.

Figure 1:
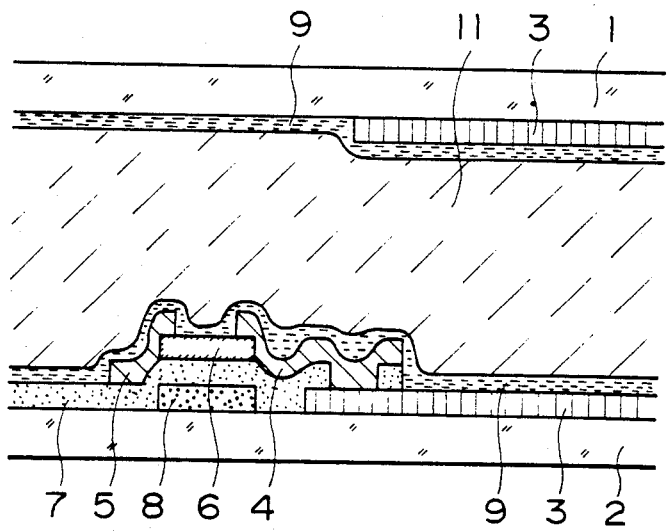
FIG. 1 is a partial sectional view showing a prior art liquid crystal device with a TFT.
Figure 2:
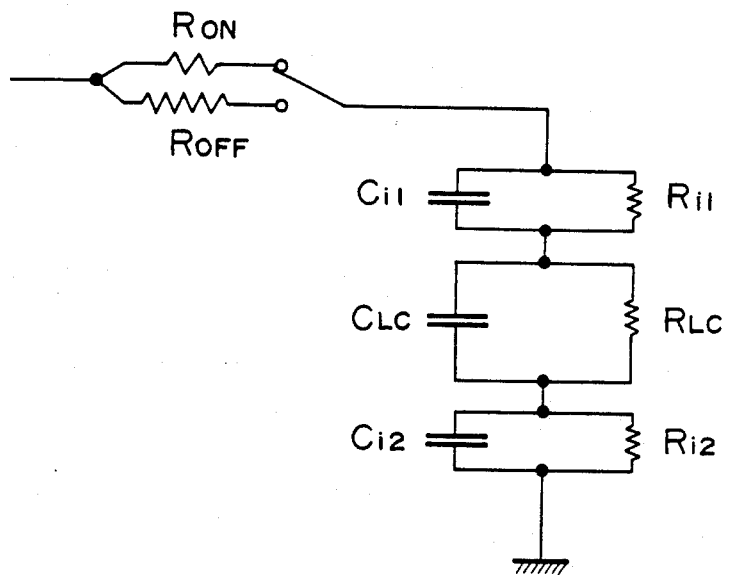
FIG. 2 is a circuit diagram showing an equivalent circuit of the device shown in FIG. 1.
Figure 3:
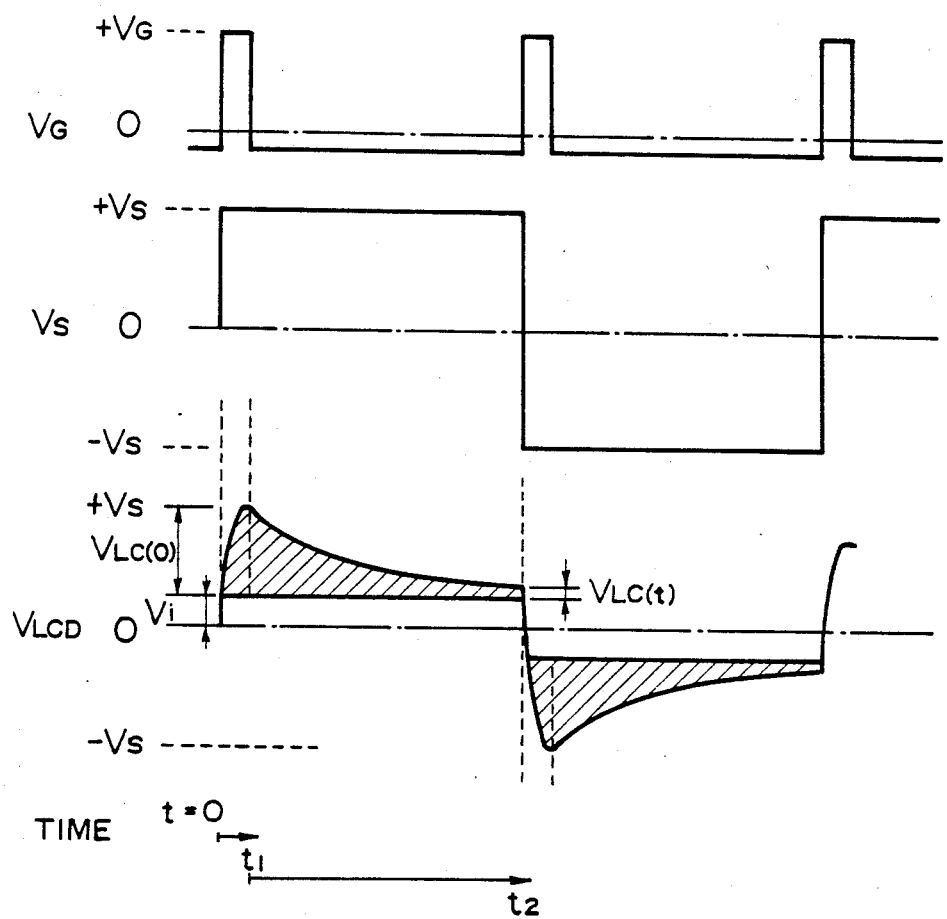
FIG. 3 is a waveform diagram showing an example of voltage waveforms when the device shown in FIG. 1 is TFT-driven.
Figure 4:
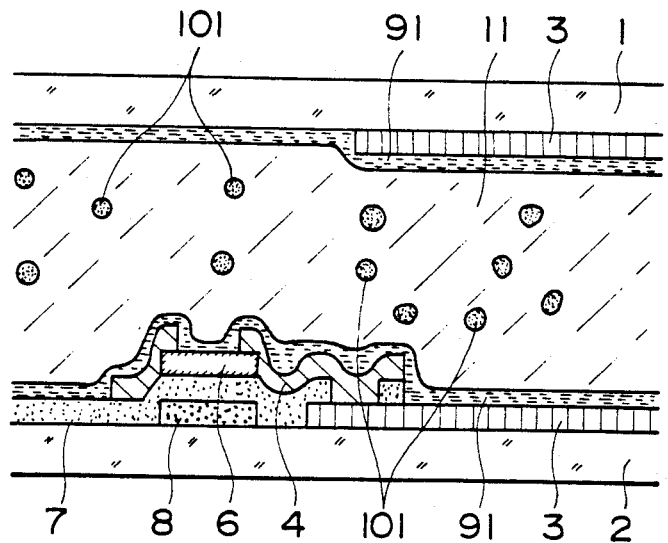
FIG. 4 is a partial sectional view showing an embodiment of the liquid crystal device according to the invention.

FIG. 4 is a sectional view showing an embodiment of the liquid crystal device according to the invention. Reference numeral 101 designates particles of the adsorbent.

The liquid crystal orientation films 91 in the liquid crystal device according to the invention may be formed of, e.g., such synthetic resins as polyimide resins, polyamide resins, polyvinyl alcohol, phenolic resins and also such coupling agents as silane coupling agents (e.g., organosilane to be described later), titanium coupling agents (e.g., tetraalkoxy titanium ($Ti(OC_3H_7)_4$, $Ti(OC_4H_9)_4$, $Ti(OC_5H_{11})_4$, etc.) and zirconium coupling agent ($Zr(OC_3H_7)_4$, $Zr(OC_4H_9)_4$, $Zr(OC_5H_{11})_4$, $Zr(OC_8H_{17})_4$, etc.).

The liquid crystal orientation film is formed by applying the material noted above in the form of a solution or liquid having a predetermined concentration as a coating on the LDC base plate using a spinner coater, a roll coater, etc.

Suitable examples of the organosilane compounds are those represented by the formula:

$$R_nSiX_{4-n}$$

where n is 1, 2 or 3, X represents an alkoxyl group, e.g., methoxy, ethoxy, propoxy and butoxy or an acyloxy group, e.g., acetoxy, or other hydrolyzable functional group, and R represents a saturated aliphatic hydrocarbon group, e.g., methyl, ethyl, propyl and butyl, or an unsaturated aliphatic hydrocarbon group, e.g., vinyl, alkenyl, or an aromatic hydrocarbon group, e.g., phenyl, naphthyl. These hydrocarbon groups may be replaced further to have substituent groups such as unsaturated groups, e.g., vinyl and alkenyl, hydroxy group, carbonyl group, halogen atom, amino group and other functional organic groups.

Examples of such organosilane compounds are as follows:

 (1)

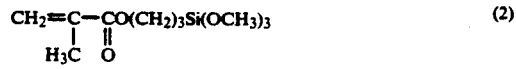 (2)

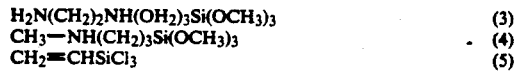 (3)
 (4)
 (5)
 (6)
 (7)

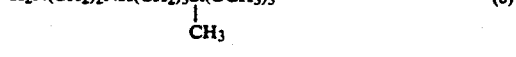 (8)

 (9)
 (10)
 (11)

Figure 6:
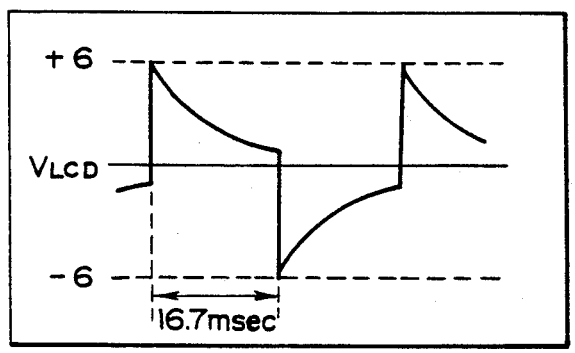
FIG. 6 is a waveform diagram showing the waveform of $V_{LCD}$ at $V_S = 6$ V (at 30 Hz) obtained by using (a) the liquid crystal composition without adsorbent and (b) liquid crystal composition with adsorbent incorporated.
Figure 6:
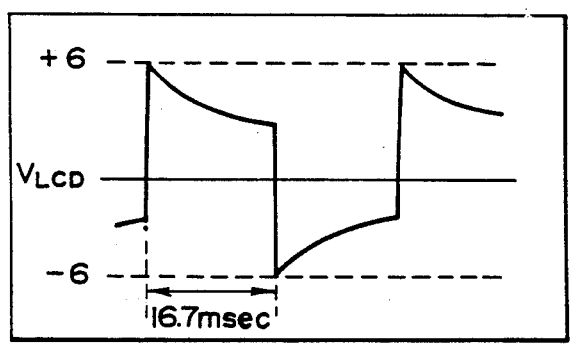

When a gate pulse $V_G$ is applied to the gate electrode 8 shown in FIG. 4 while $+V_S$ volts is simultaneously applied to the source 5, the voltage $V_{LCD}$ between the picture element electrodes 3 quickly reaches $+V_S$. With subsequent fall of $V_G$, $V_{LCD}$ is reduced from $+V_S$. The curve (b) in FIG. 6 shows change in $V_{LCD}$ in case of Example 1 (where $V_S = 6$ V) which will be described hereinafter. On the other hand, the curve (a) in FIG. 6 shows change in $V_{LCD}$ in the case of a prior art example where no adsorbent is incorporated. It will be seen that the value of $V_{LCD}$ after the lapse of 6.7 msec. is retained at a higher level according to the invention by comparing the curves.

Figure 7:
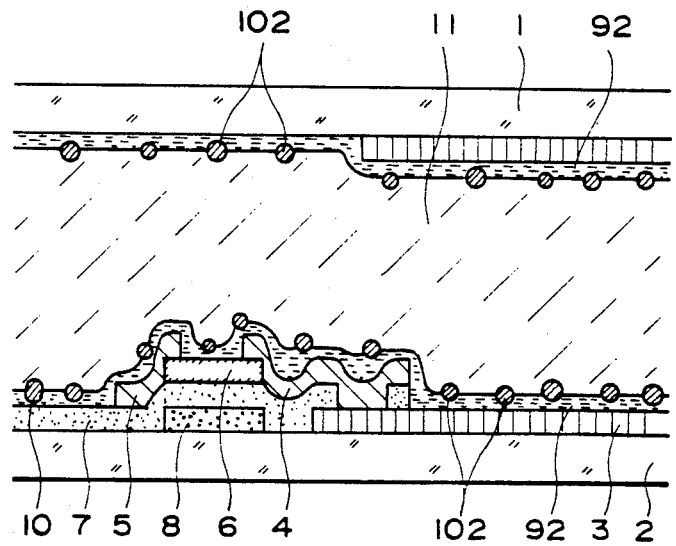
FIG. 7 is a partial sectional view showing an embodiment of the liquid crystal device according to the invention.

FIG. 7 shows another preferred example of the liquid crystal device according to the invention. In this example, the adsorbent for ionic substance is provided in liquid crystal orientation-controlling films 92 and on the surfaces thereof contiguous to the liquid crystal. The liquid crystal orientation controlling films 92 used in the liquid crystal device shown in FIG. 7, like the orientation films 91 noted above, may comprise such synthetic resins as polyimide resins, polyamide resins, polyvinyl alcohol and phenolic resins or such coupling agents as silane coupling agents, titanium coupling agents and zirconium coupling agents.

The orientation controlling film is formed by applying the material noted above in the form of a solution or liquid having a predetermined concentration as a coating on the LCD base plate using a spinner, a roll coater, etc.

The adsorbent for ionic substance 102 may comprise alumina, zeolite, ion-exchange resins, carbon and such metals as metallic aluminum, metallic nickel and iron-cobalt alloys.

The particle size of the adsorbent 102 should be smaller than the size of the spacer (approximately 10 $\mu$) and is preferably in a range of 1 to 0.005 $\mu$.

The amount of the adsorbent 102 is preferably 0.05 to 5 parts by weight, more preferably 0.1 to 2 parts by weight, with respect to 100 parts by weight of the liquid crystal orientation film.

In order to provide the ionic adsorbent 102 in the liquid crystal orientation film 92 and also in a planar arrangement contiguous to the liquid crystal, the following method is suitable. First, the material of the eventual liquid crystal orientation film 92 in the form of a solution or liquid having a predetermined concentration is applied as a coating on the LCD base plate using a spinner coater, a roll coater, etc. When the coating film is semi-solidified due to evaporation of the solvent and/or hardening reaction i.e., in the state that the coating film has a certain hardness but also has a viscosity sufficient for securing adsorbent particles, a dispersion of fine particles of the adsorbent dispersed in a dispersing medium by means of an ultrasonic vibrator or the like is applied on the semi-solidified film using a spinner or the like, followed by drying and then sintering. By this method, it is possible to have fine particles of the adsorbent 102 firmly secured to the surface of the liquid crystal orientation film 92. The particles thus secured to the surface are not readily removed by a subsequent rubbing treatment. As is shown, the adsorbent 102 is partly burried in the liquid crystal orientation film 92, and the rest is exposed on the surface of the orientation film 92 and is in contact with the liquid crystal 11. When a gate pulse $V_G$ is applied to the gate electrode 6 while $+V_S$ volts is simultaneously applied to the source 5, the voltage $V_{LCD}$ between the picture element electrodes 3 quickly reaches $+V_S$, and with subsequent fall of $V_G$, $V_{LCD}$ is reduced to $V_S$. The curve (b) in FIG. 9 shows this change in voltage $V_{LCD}$ in case of Example 5 where $V_S = 6$ V described hereinafter. The curve (a) in FIG. 9 shows $V_{LCD}$ in case of a prior art example having non-treated liquid crystal orientation films (i.e., where the liquid crystal is not in contact with any adsorbent). It will be seen that $V_{LCD}$ after the lapse of 16.7 msec. is retained at a higher level according to the invention.

This embodiment is preferable to the formerly described example wherein an ionic adsorbent such as alumina is dispersed in the liquid crystal. This is because, in the former embodiment, the particles dispersed in the liquid crystal are liable to agglomerate into large particles to result in black dots if the surface charge of the particles is reduced by adsorption of ions, etc. Thus, more satisfactory results can be obtained by having the adsorbent fixed in some form as in the latter described embodiment of the invention rather than having the adsorbent dispersed in the liquid crystal.

The sealing material for securing the pair of base plates to each other and an inlet sealing material for sealing the liquid crystal inlet are thought to constitute other sources of liquid crystal contamination. Similar results can also be obtained with respect to these contamination sources by incorporating therein an adsorbent such as alumina.

The present invention will be described more specifically by way of examples.

EXAMPLE 1

Figure 5:
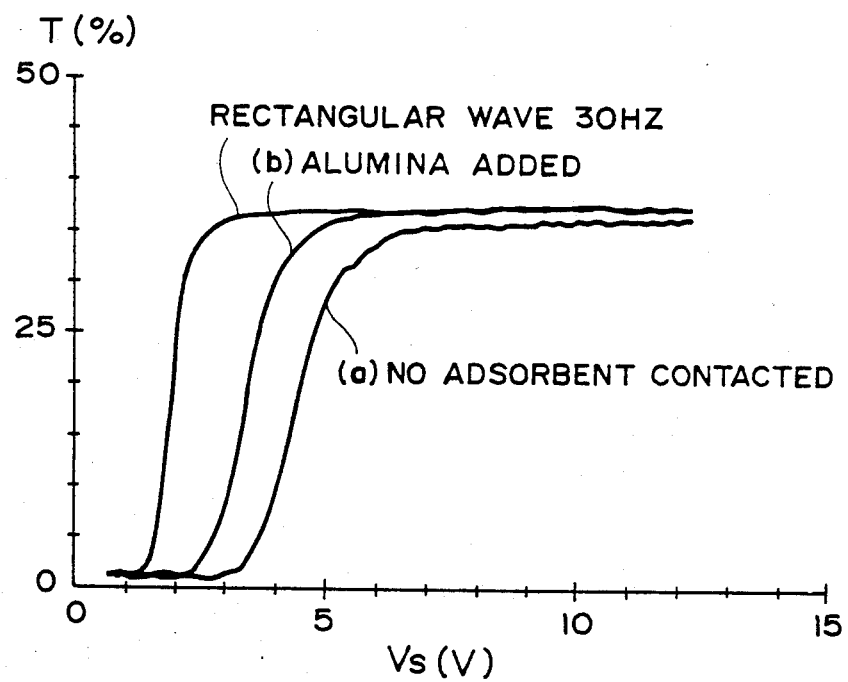
FIG. 5 is a graph showing a V-T (voltage versus transparency) curve (a) obtained with a liquid crystal composition containing no adsorbent and a V-T curve (b) obtained by using a liquid crystal composition with an adsorbent incorporated therein according to the invention.

Fine alumina particles (manufactured by Fujimi Kenmazai K. K.) with an average particle size of 500 Å were dispersed in "E-7" (a biphenyl type nematic liquid crystal composition available for BDH Chemicals Ltd.) and the resultant dispersion was poured into a cell to form an LCD having a structure as shown in FIG. 4. With this LCD, a V-T (voltage versus transparency) curve as shown in FIG. 5(b) was obtained. Also, change in $V_{LCD}$ as shown in FIG. 6(b) was obtained. It will be seen that with the LCD according to the invention, the shift of the V-T curve is reduced, and $V_{LCD}$ after a certain period of time is increased.

It is to be noted that pronounced effects of the invention are obtained in the TFT driving system.

EXAMPLES 2 to 4

LCDs were produced by introducing liquid crystal compositions containing adsorbent prepared in the same manner as in Example 1 except that adsorbents as in Table 1 below were used in lieu of alumina. V-T curves and $V_{LCD}$ waveforms of these LCDs showed substantially the same satisfactory results as those of Example 1.

TABLE 1

| No. | Adsorbent | Average particle size | Manufacturer |
|---|---|---|---|
| Example 2 | Al | 1000 Å | Shinku Yakin K.K. |
| Example 3 | Ni | 300 Å | Shinku Yakin K.K. |
| Example 4 | Fe.Co | 300 Å | Shinku Yakin K.K. |

EXAMPLE 5

A polyimide solution "SP-510" (a trade name of Toyo Rayon K. K.) was diluted with dimethylacetamide as solvent to a desired concentration and then applied on an LCD base plate using a spinner coater, followed by sintering at 180° C. for about one hour to obtain a semisolidified film. Meanwhile, a dispersion obtained by dispersing alumina with an average particle size of 500 Å in a solvent containing a low-boiling point fluoro-hydrocarbon such as "Fleon" or 1,1,2-trichloro- 1,2,2-trifluoroethane while applying constant ultrasonic vibration, was applied onto the orientation film by using a spinner coater, followed by sintering at 250 to 300° C. for one hour to obtain a polyimide film containing dispersed adsorbent. The adsorbent was incorporated in a proportion of 0.5 part by weight with respect to 100 parts by weight of the orientation film. The adsorbent was not removed in a subsequent rubbing treatment. Thus, the adsorbent could be secured to the surface of the orientation film.

Figure 8:
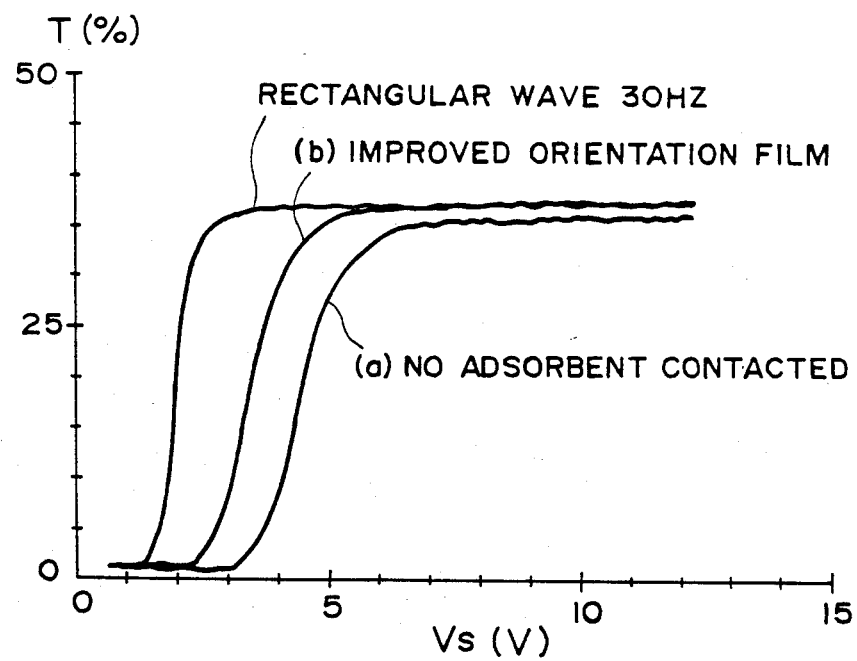
FIG. 8 is a graph showing a V-T curve (a) obtained with a non-treated orientation film and a V-T curve (b) obtained with an orientation film improved according to the invention.

The curves (b) in FIG. 8 and FIG. 9 respectively show V-T curve and $V_{LCD}$ waveform obtained with an LCD as shown in FIG. 7 having the orientation films thus prepared and containing the liquid crystal "E-7". It will be seen that the voltage versus time curve is shifted toward the lower voltage side compared with the case where the orientation films were not treated, because $R_{LC}$ was increased. The effects of the method of securing adsorbent according to the invention are thus evident.

EXAMPLES 6 to 8

LCDs having orientation films containing adsorbent the same as in Example 5 except that adsorbents as in Table 2 below were used in lieu of alumina, were produced by introducing the liquid crystal "E-7". V-T curves and $V_{LCD}$ waveforms showed that substantially the same satisfactory results as those of Example 5.

TABLE 2

| No. | Adsorbent | Average particle size | Manufacturer |
|---|---|---|---|
| Example 6 | Al | 1000 Å | Shinku Yakin K.K. |
| Example 7 | Ni | 300 Å | Shinku Yakin K.K. |
| Example 8 | Fe.Co | 300 Å | Shinku Yakin K.K. |

As has been described, according to the invention, it is possible to prevent reduction in the resistance $R_{LC}$ of the liquid crystal layer, i.e., to prevent the shift of the voltage versus time curve to the higher voltage side, when an LCD is driven with TFTs. Further, it is possible to realize low voltage driving and constant voltage driving to stable operating characteristics. Further, since $R_{LC}$ can be held at a high level, a large time constant $\tau_{OFF}$ of discharge process can be obtained to extend the information holding period and improve the quality of image display.

Further, the increase in $\tau_{OFF}$ means the possibility of increasing the number of scanning lines per unit area of display. Thus, it is possible to improve the quality of display (e.g., liquid crystal television display).

According to the invention, it is also possible to use cholesteric liquid crystals, smectic liquid crystals and ferroelectric chiral smectic liquid crystals as well as nematic liquid crystals noted above.

What is claimed is:

1. A liquid crystal device having a cell structure comprising a pair of base plates having a thin film transistor formed thereon, a liquid crystal disposed between the pair of base plates and electrically connected to the thin film transistor, and an adsorbent for ionic substance in the form of particles with an average diameter in the range of 1 to 0.005 microns dispersed in the liquid crystal.

2. The liquid crystal device according to claim 1, wherein said adsorbent is used in a proportion of 0.2 to 0.05% by weight of said liquid crystal.

3. The liquid crystal device according to claim 1, wherein said adsorbent comprises particles of at least one member selected from the group consisting of alumina, zeolite, ion-exchange resin, carbon, aluminum, nickel and iron-cobalt alloy.

4. The liquid crystal device according to claim 1, wherein at least one of said base plates is provided with an orientation controlling film.

5. The liquid crystal device according to claim 4, wherein said orientation controlling film comprises at least one member selected from the group consisting of polyimide, polyamide, polyvinyl alcohol and phenolic resin.

6. The liquid crystal device according to claim 4, wherein said deflection control film comprises at least one member of a group consisting of silane coupling agent, titanium coupling agent and zirconium coupling agent.

* * * * *

UNITED STATES PATENT AND TRADEMARK OFFICE
CERTIFICATE OF CORRECTION

PATENT NO. : 4,666,253

DATED : May 19, 1987

INVENTOR(S) : AKIO YOSHIDA

It is certified that error appears in the above-identified patent and that said Letters Patent is hereby corrected as shown below:

COLUMN 4

Line 21, "LDC" should read --LCD--.

COLUMN 5

Line 56, "burried" should read --buried--.

COLUMN 6

Line 28, "for" should read --from--.

COLUMN 7

Line 27, "that" should be deleted.

COLUMN 8

Line 39, "deflection" should read --orientation--.

Signed and Sealed this

Twenty-ninth Day of September, 1987

Attest:

DONALD J. QUIGG

Attesting Officer      Commissioner of Patents and Trademarks